US008433766B2

(12) United States Patent
Munje et al.

(10) Patent No.: US 8,433,766 B2
(45) Date of Patent: *Apr. 30, 2013

(54) SYSTEM AND METHOD FOR PROVIDING INFORMATION ON A RECEIVED COMMUNICATION FOR AN ELECTRONIC COMMUNICATION DEVICE

(75) Inventors: Arun Munje, Waterloo (CA); Andrew Turcotte, Waterloo (CA); David Vanden Heuvel, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/351,837

(22) Filed: Jan. 17, 2012

(65) Prior Publication Data

US 2012/0117174 A1  May 10, 2012

Related U.S. Application Data

(63) Continuation of application No. 12/984,728, filed on Jan. 5, 2011, now Pat. No. 8,131,812, which is a continuation of application No. 11/619,679, filed on Jan. 4, 2007, now Pat. No. 7,890,589.

(51) Int. Cl.
*G06F 15/16* (2006.01)

(52) U.S. Cl.
USPC .................. 709/206; 379/88.22; 379/372

(58) Field of Classification Search .................. None
See application file for complete search history.

(56) References Cited

U.S. PATENT DOCUMENTS

| | | | |
|---|---|---|---|
| 6,108,688 | A | 8/2000 | Nielsen |
| 6,430,272 | B1 | 8/2002 | Maruyama et al. |
| 6,963,904 | B2 | 11/2005 | Yong |
| 7,269,793 | B2 | 9/2007 | Horsfall et al. |
| 2005/0223057 | A1 | 10/2005 | Buchheit et al. |
| 2006/0031308 | A1 | 2/2006 | Colson |
| 2007/0090923 | A1 | 4/2007 | Kraft et al. |
| 2008/0037744 | A1 | 2/2008 | Fux et al. |
| 2008/0059590 | A1 | 3/2008 | Sarafijanovic et al. |

FOREIGN PATENT DOCUMENTS

| | | |
|---|---|---|
| GB | 2350747 | 12/2000 |
| WO | WO 00/74349 | 12/2000 |

OTHER PUBLICATIONS

GOOGLE.COM, "About Gmail", 2006, 6 pages.
"About Gmail: Conversation View Screenshot", http://mail.google.com/mail/help/screen2.html. Published Apr. 7, 2006.
Hussain, Askar comment on "Gmail gets some new features", Bold-Italic-Underline, comment posted on Nov. 10, 2006, http://askars.wordpress.com/2006/11/10/gmail-gets-some-new-features.

*Primary Examiner* — Dustin Nguyen
(74) *Attorney, Agent, or Firm* — McCarthy Tétrault LLP

(57) ABSTRACT

The disclosure relates to a system, method and device for providing information relating to a received communication for a device. The method comprises generating and providing a message on a display of the device indicating receipt of an inbound communication, after determining that the device is to receive the inbound communication while the device is composing an outbound communication and after determining the inbound communication is related to the outbound communication by an analysis of information of the inbound communication against information of the outbound communication. The message provides options for processing the inbound communication depending on whether the outbound communication is initiated as either a reply to the inbound communication or a forwarding of the inbound communication.

17 Claims, 10 Drawing Sheets

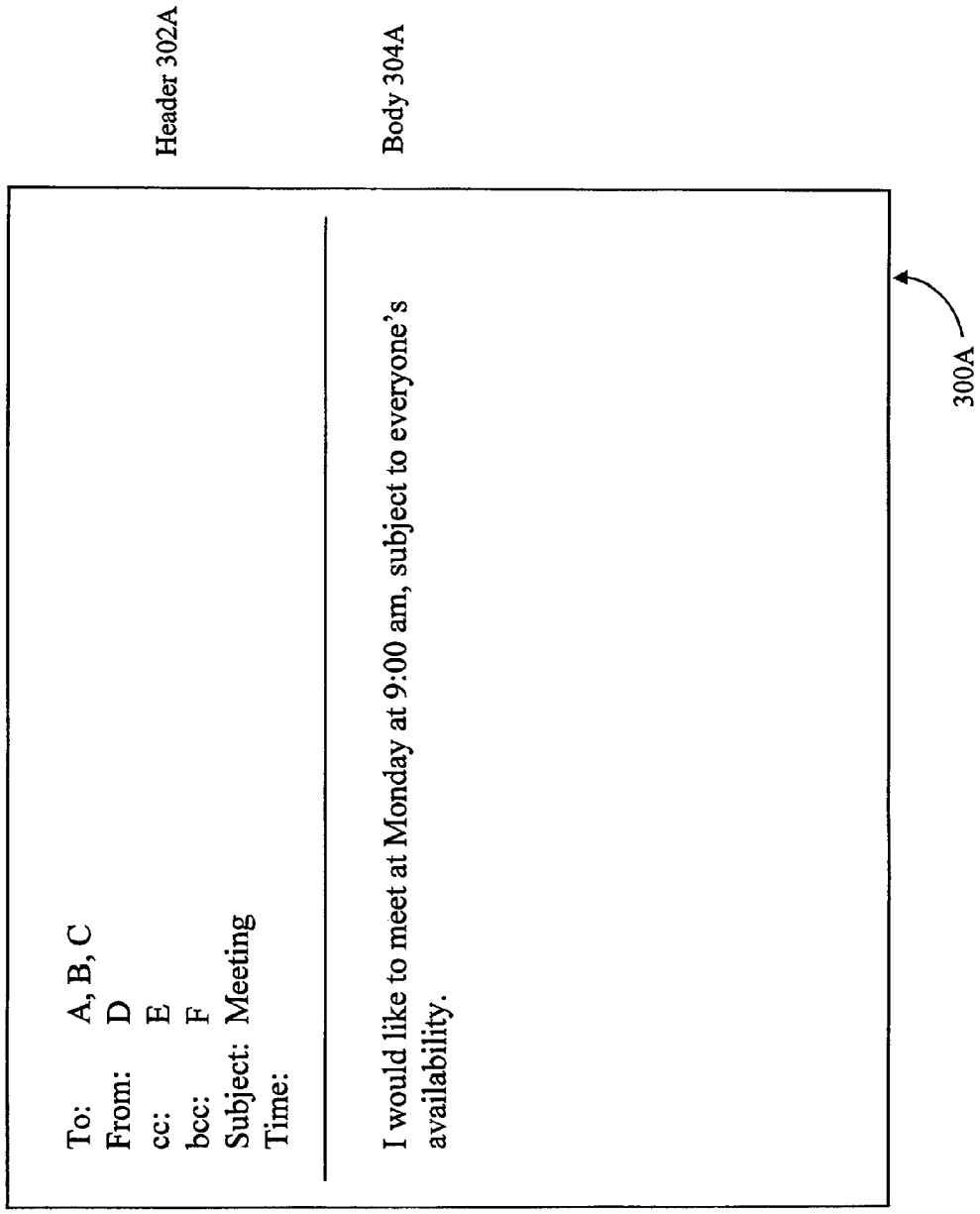

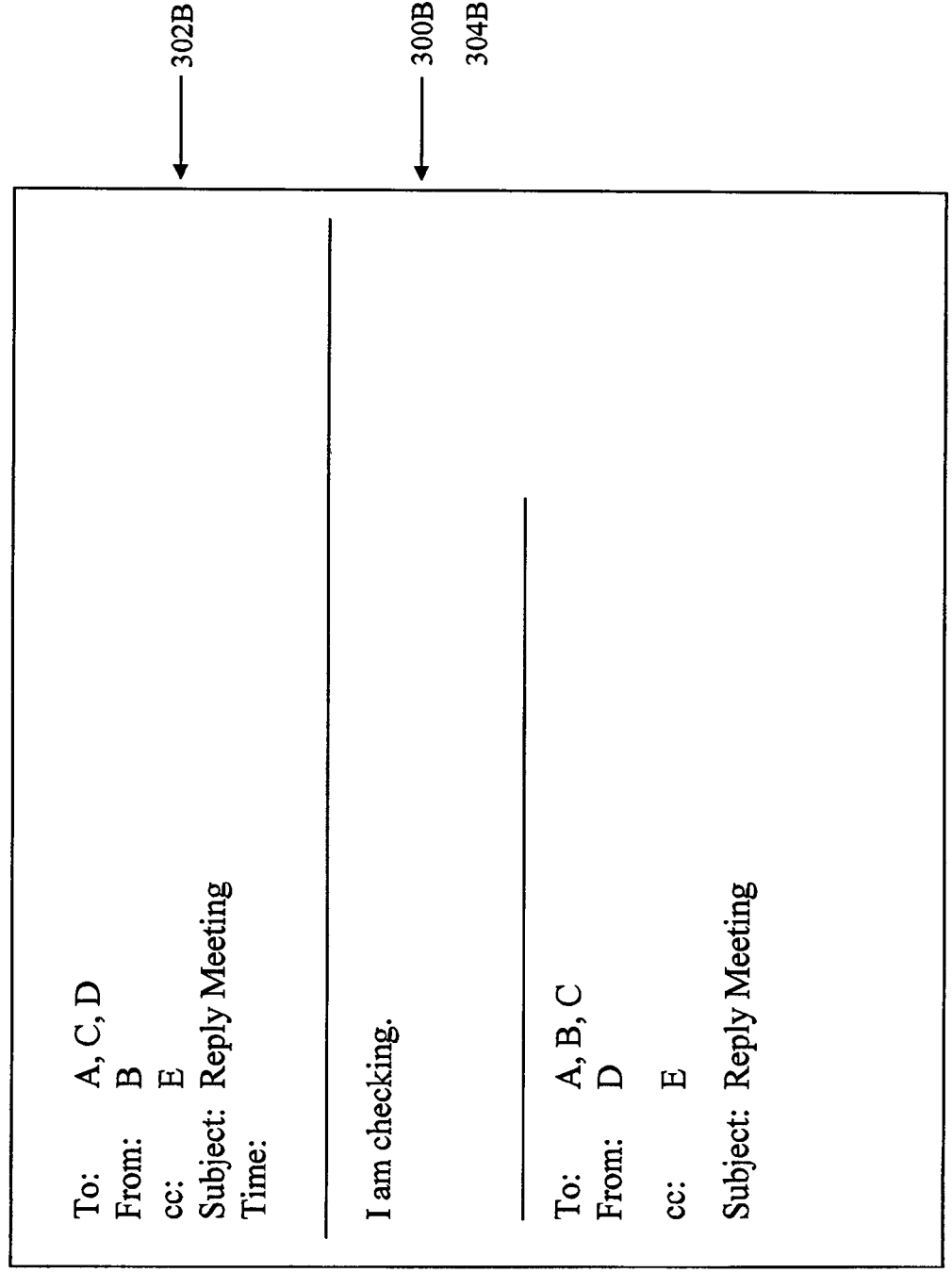

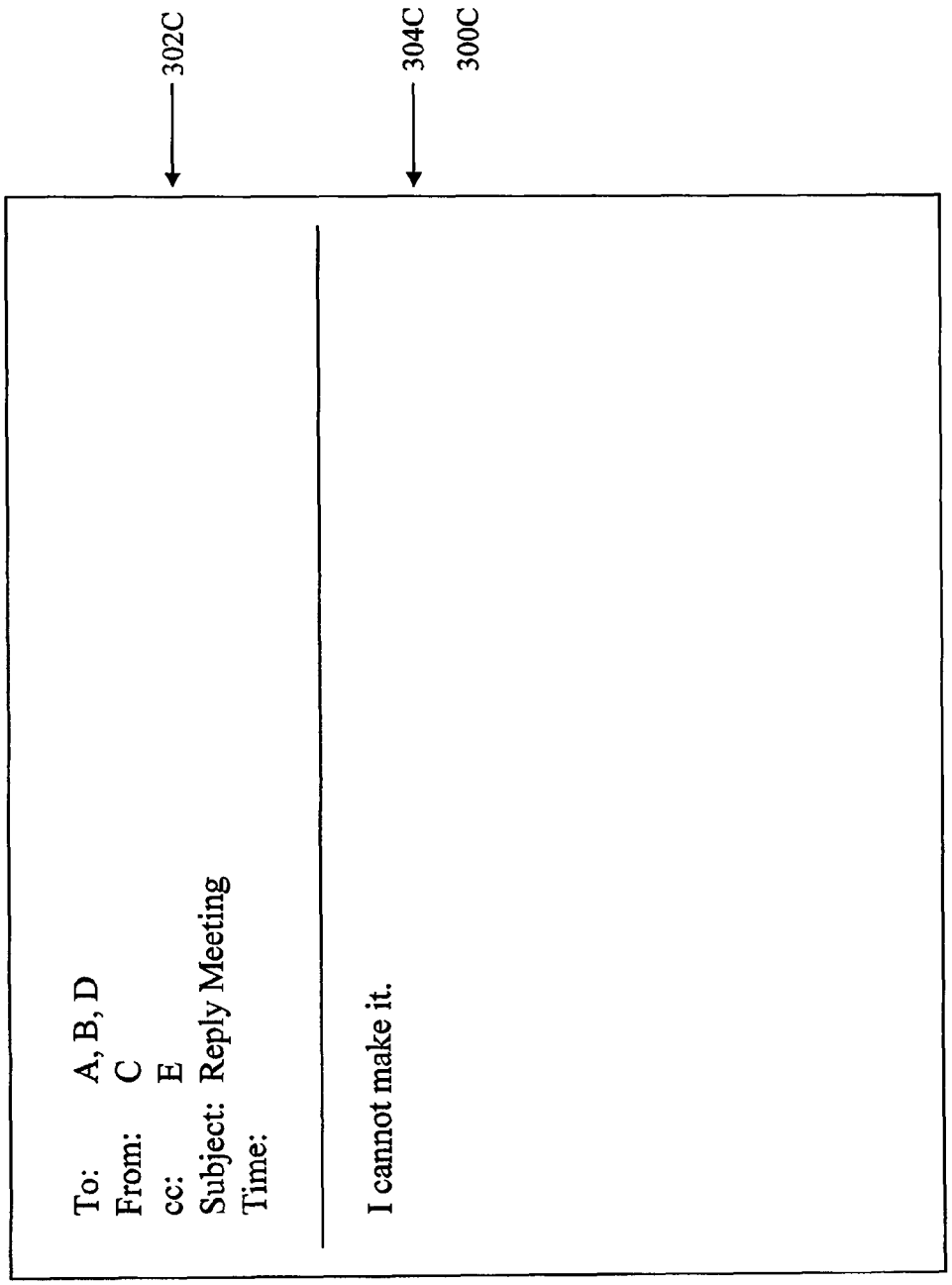

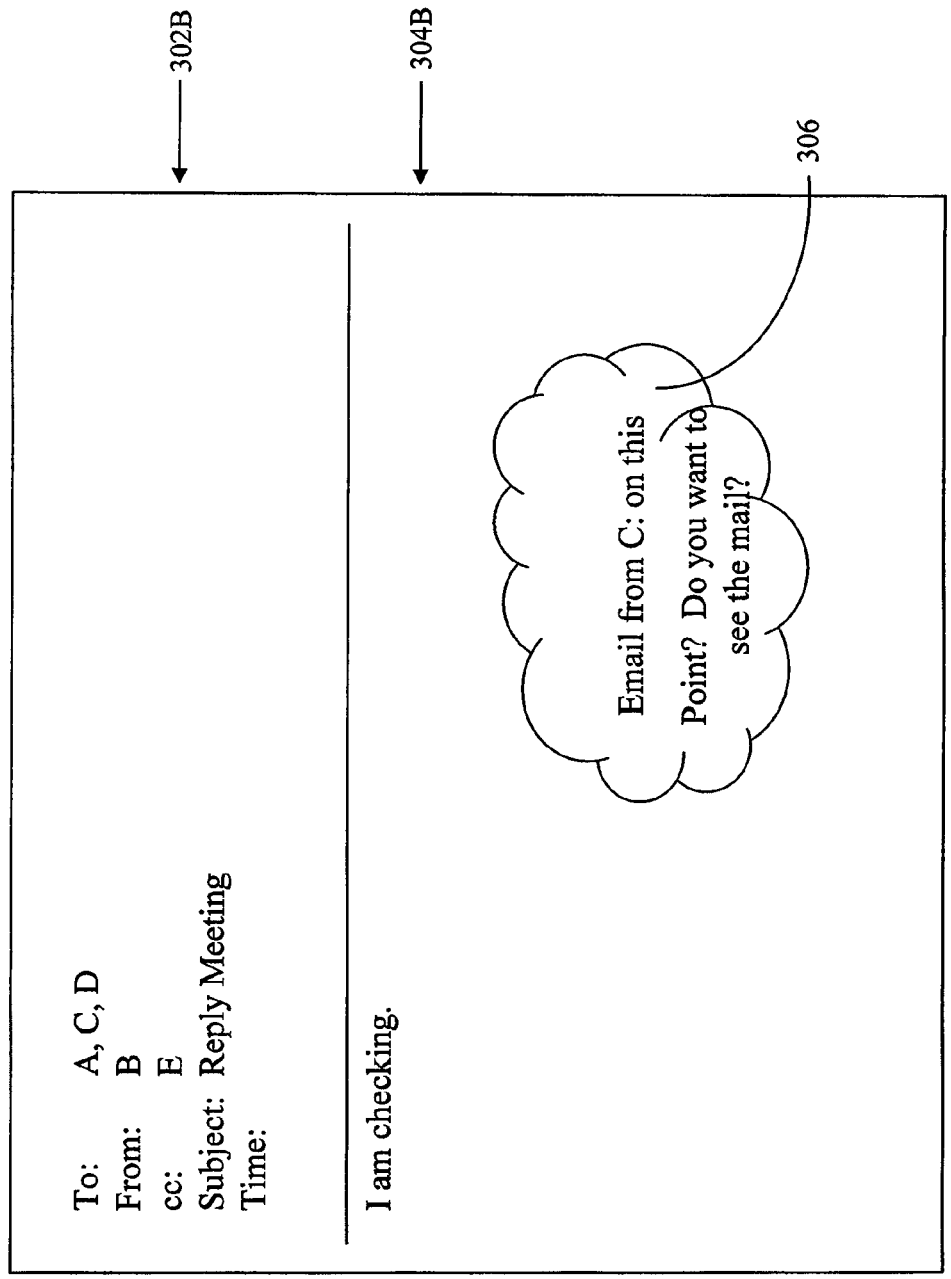

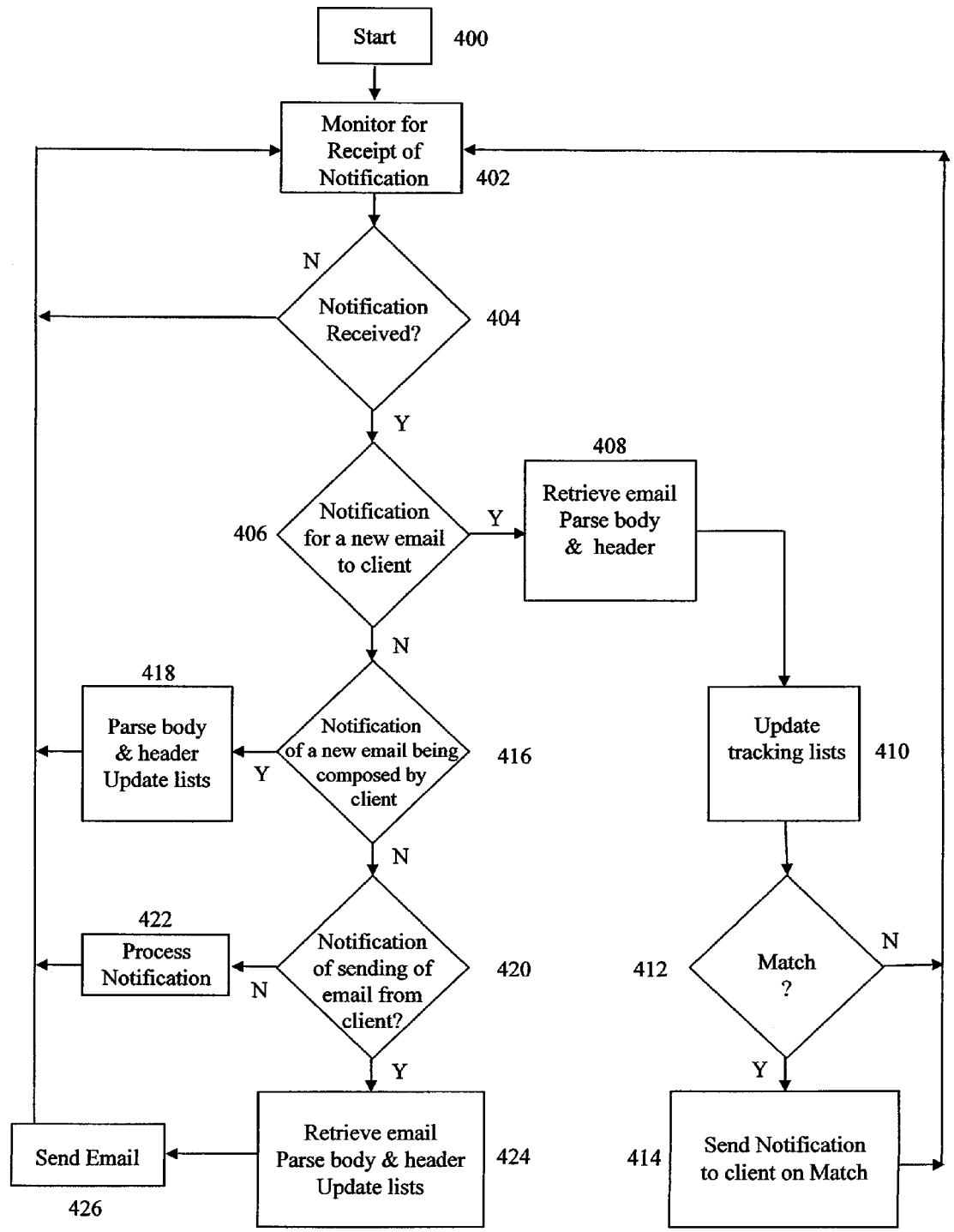

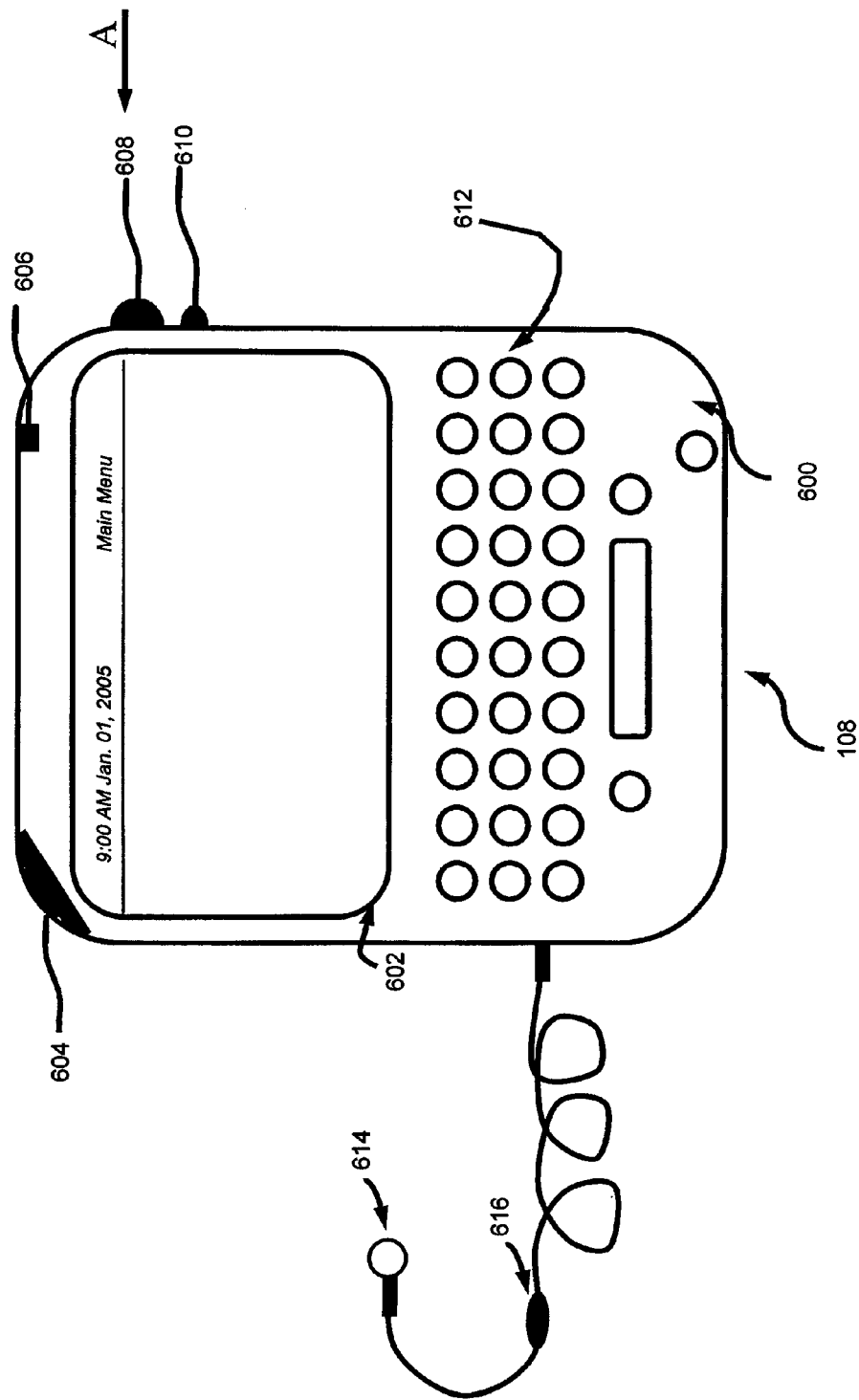

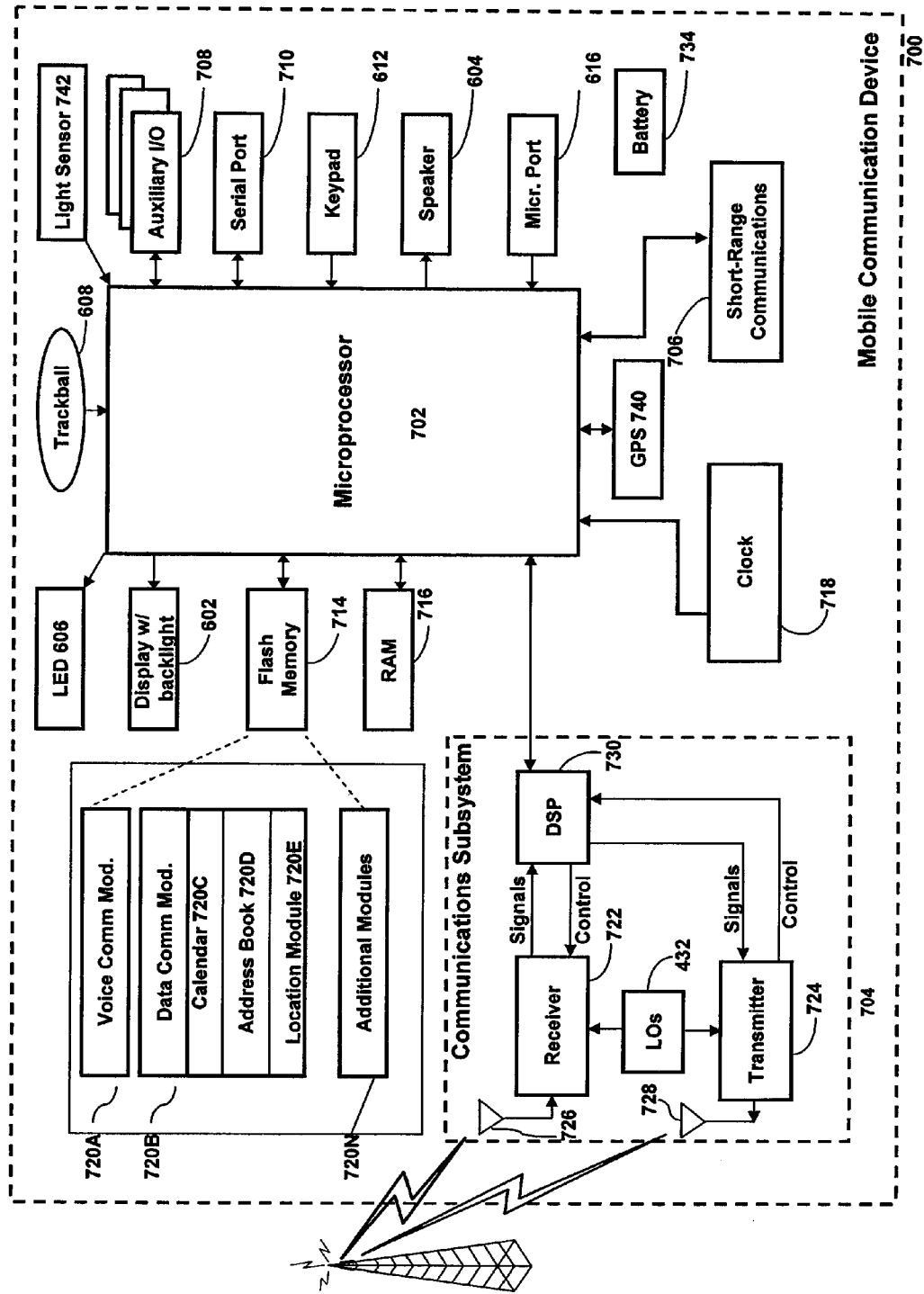

SYSTEM AND METHOD FOR PROVIDING INFORMATION ON A RECEIVED COMMUNICATION FOR AN ELECTRONIC COMMUNICATION DEVICE

RELATED APPLICATION

This application is a U.S. continuation application of U.S. patent application Ser. No. 12/984,728, filed on Jan. 5, 2011, now U.S. Pat. No. 8,131,812, which is a continuation of U.S. patent application Ser. No. 11/619,679, filed on Jan. 4, 2007, now U.S. Pat. No. 7,890,589.

FIELD OF DISCLOSURE

The disclosure relates to a system and method for providing information on a received communication for an electronic communication device. In particular, the disclosure relates to providing a notification of receipt of an email that relates to a message currently being composed on the device.

BACKGROUND

Email is an ubiquitous means of electronic communications allowing a user to create and distribute an electronic message to others. Typical parts of an email include a body for the message and a header. The header generally includes a subject line, a timestamp and a distribution list. The distribution list allows multiple recipients to be identified in the "to", "cc" and "bcc" fields.

When an email is generated having several addressees in the distribution list, the subsequent email string of replies can become a mesh of overlapping replies from different addressees. For example, replies can be generated from any number of the addressees and can be sent to any number of different addressees in the string. This can cause information gaps when an addressee is creating a responding email to the string. As the responding email is being created by a user, he may receive a relevant reply from another addressee in the string. The user may complete and send his responding email, without having the benefit of knowing about the reply.

Prior art email programs operating on personal computers may present a "ghost" pop-up message indicating that an email has been received, such as in Microsoft Outlook 2003. However, such messages are provided for every incoming email without being customized for the current state of the recipient of the message. As such, a user tends to ignore such messages. Also, email programs operating on portable devices do not have such facilities.

There is a need for a system and method which addresses deficiencies in the prior art.

BRIEF DESCRIPTION OF THE DRAWINGS

Embodiments of the disclosure will now be described, by way of example only, with reference to the accompanying drawings, in which:

FIG. 3A is a diagram of an email that originates an email string that is processed by an embodiment associated with the email server of FIG. 1;

FIG. 3B is a diagram of a reply email from an addressee in the email string of the email of FIG. 3A that is processed by an embodiment associated with the email server of FIG. 1;

FIG. 3C is a diagram of a reply email from another addressee in the email string of the email of FIG. 3A that is processed by an embodiment associated with the email server of FIG. 1;

FIG. 3D is a diagram of a reply email of FIG. 3B further updated by an embodiment associated with the email server of FIG. 1;

FIG. 4 is a flowchart of exemplary steps executed by the email server of FIG. 1 in monitoring for, and responding to, emails in accordance with an embodiment;

FIG. 6 is a schematic representation of a wireless electronic device in communication with the email server of FIG. 1 in accordance with an embodiment; and FIG. 7 is a block diagram of certain internal components of the device in FIG. 6.

DETAILED DESCRIPTION OF AN EMBODIMENT

Figure 1:
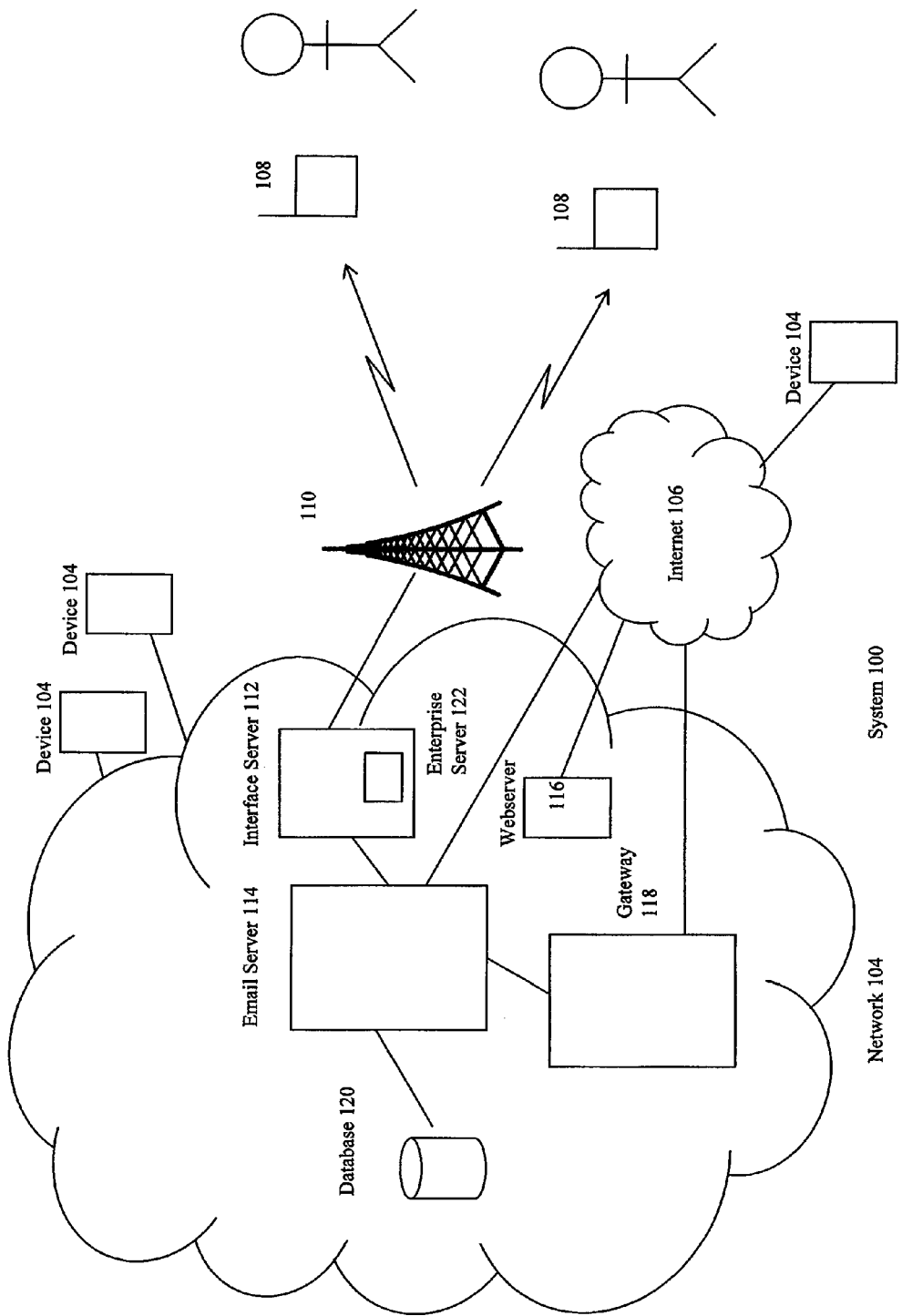
FIG. 1 is a schematic diagram of a communication network providing email communications as provided in an embodiment among devices connected to the network through an email server.

The description which follows and the embodiments described therein are provided by way of illustration of an example or examples of particular embodiments of the principles of the present disclosure. These examples are provided for the purposes of explanation and not limitation of those principles and of the disclosure. In the description which follows, like parts are marked throughout the specification and the drawings with the same respective reference numerals.

Generally, an embodiment provides a system and method of notifying a user of a communication program while he is composing an outbound communication on a device, that a new inbound communication has been received that relates to the outbound communication he is composing. The notification can be provided in one or more indicators, including: an icon, a "pop-up" message generated on the display of the device, activation of a special lamp on the device or additional notifications. Other options relating to the composition, merging, saving and processing of the outbound and/or inbound message may also be provided to the user.

In a first aspect, a method for providing information relating to a recently received communication for a device is provided. The method comprises generating and providing a message on a display of the device indicating receipt of an inbound communication, after determining that the device is to receive the inbound communication while the device is composing an outbound communication and after determining the inbound communication is related to the outbound communication by an analysis of information of the inbound communication against information of the outbound communication. In the method, the message provides options for processing the inbound communication depending on whether the outbound communication is initiated as either a reply to the inbound communication or a forwarding of the inbound communication.

In the method, the information may be contained in a subject field of the inbound communication.

The method may further comprise: providing options to the user to incorporate the inbound communication into the outbound communication or to review the inbound communication.

The method may further comprise: maintaining a database tracking received inbound communications destined for the device; and updating the database upon receipt of the inbound communication for the device.

The method may further comprise updating the database to delete a record relating to the outbound communication if the outbound communication is cancelled prior to its transmission from the device.

In the method, the outbound communication may be an email being composed; the inbound communication may be a received email; the device may operate email client software; and the received email may be forwarded to the device from an email server.

In the method, the email client software and the email server may communicate through generation and transmission of messages therebetween relating to received emails and emails being composed.

In the method, the monitoring may be terminated when the email is either saved or sent.

The method may further comprise upon activation of a send command for the outbound communication from the device, generating and providing a second message on the display of the device indicating receipt of the inbound communication.

In the method, the second message may provide an option to reply to an addressee of the outbound communication with a new message for the outbound communication or to continue sending the outbound communication.

In the method, the second message may provide a first set of options for processing the outbound communication when the outbound communication is initiated as a reply to the inbound communication, a second set of options for processing the inbound communication when the outbound communication is initiated as a forwarding of the inbound communication and third set of options for processing the inbound communication when the outbound communication is initiated as a reply to all to the inbound communication.

In the method, the options may include a first set of options for processing the inbound communication when the outbound communication is initiated as a reply to the inbound communication, a second set of options for processing the inbound communication when the outbound communication is initiated as a forwarding of the inbound communication and a third set of options for processing the inbound communication when the outbound communication is initiated as a reply to all to the inbound communication.

In the method, when the outbound communication is initiated as the reply, a warning message may be generated if a distribution list of addressees associated with the outbound communication differs from a distribution list of the inbound communication.

In a second aspect, an electronic communication module for processing inbound and outbound communications on a communication device is provided. The module provides instructions to a microprocessor on the device to generate a message on a display of the device when the device has received an inbound communication and the device is creating an outbound communication relating to the outbound communication, where the message provides options for processing the inbound communication depending on whether the outbound communication is initiated as either a reply to the inbound communication or a forwarding of the inbound communication. For the module, the device communicates with a communication server providing the inbound communication to the device.

The module may provide instructions to the microprocessor to provide options to incorporate the inbound communication into the outbound communication or to review the inbound communication.

In a third aspect, an electronic communication device providing processing of inbound and outbound communications is provided. The device comprises: memory; a module to compose an outbound communication; a module to generate and transmit a notification about the outbound communication when the outbound communication is being composed; a module to monitor for receipt of an inbound communication or a second notification; a module to evaluate information in the inbound communication against information of the outbound communication to determine whether the inbound communication is related to the outbound communication; and a module to generate a message on a display of the device if the inbound communication is related to the outbound communication, indicating receipt of the inbound communication. For the device, the message provides options for processing the inbound communication depending on whether the outbound communication is initiated as either a reply to the inbound communication or a forwarding of the inbound communication.

For the device, the device may operate email client software; and the email client software and the email server may communicate through generation and transmission of messages relating to received emails and emails being composed.

For the device, an option may be provided to merge at least part of the inbound communication to the outbound communication after the inbound communication is determined to be related to the outbound communication.

For the device, merging of the inbound communication to the outbound communication may be selectively undone to remove text of the inbound communication from the outbound communication.

For the device, for the message, the options may include a first set of options for processing the inbound communication when the outbound communication is initiated as a reply to the inbound communication, a second set of options for processing the inbound communication when the outbound communication is initiated as a forwarding of the inbound communication and a third set of options for processing the inbound communication when the outbound communication is initiated as a reply to all to the inbound communication.

In another aspect, a method for providing information relating to a recently received communication for a device is provided. The method comprises: while the device is composing an outbound communication, monitoring for receipt of an inbound communication; if the inbound communication is directed to the device, evaluating the inbound communication to determine whether it is related to the outbound communication; and if the inbound communication is related to the outbound communication, providing a message to the device indicating receipt of the inbound communication.

In the method, if the inbound communication is related to the outbound communication, the method may provide an option to a user of the device to incorporate the inbound communication into the outbound communication.

The method may further comprise: maintaining a database tracking all received communications destined for the device; updating the database upon receipt of a new communication for the device; and comparing entries in the database with components from the outbound communication to determine whether the inbound communication is related to the outbound communication.

The method may further comprise updating the database to delete a record relating to the outbound communication if it is cancelled prior to its transmission from the device.

In the method, the outbound communication may be an email being composed; the inbound communication may be a received email; and the received email may be deemed to be related to the email being composed if the subject lines of the email being composed and the received sufficiently match.

In the method, the device may be operating email client software; and the received email may be forwarded to the device from an email server.

In the method, the email client software and the email server may communicate through generation and transmission of messages relating to received emails and emails being composed.

In the method, the monitoring may continue after the email is sent. Additionally or alternatively, in the method, the monitoring may be terminated when the email is either saved or sent.

In another aspect, an electronic communication device providing processing of inbound and outbound communications is provided. The device comprises: a module to compose an outbound communication; a module to monitor for receipt of an inbound communication; a module to evaluate the inbound communication to determine whether it is related to the outbound communication; and a module to generate a message on a display of the device if the inbound communication is related to the outbound communication, indicating receipt of the inbound communication.

In the device, the module to compose the outbound communication may provide an option shown on the display to incorporate the inbound communication into the outbound communication.

The device may communicate with a communication server providing the inbound communication to the device. Further, the server may comprise a database tracking all received communications destined for the device. The server may update the database upon receipt of a new communication for the device. Also, the server may compare entries in the database with components from the outbound communication to determine whether the inbound communication is related to the outbound communication.

In yet another aspect, an electronic communication system is provided, comprising an electronic communication device and a communication server. The electronic communication device provides processing of inbound and outbound communications and comprises: a module to compose an outbound communication; a module to generate and transmit a notification about the communication; a module to monitor for receipt of an inbound communication; a module to evaluate the inbound communication to determine whether it is related to the outbound communication; and a module to generate a message on a display of the device if the inbound communication is related to the outbound communication, indicating receipt of the inbound communication. The communication server is in communication with the device and comprises: a database tracking all received communications destined for the device; a module to update the database upon receipt of a new communication for the device; a module to receive the notification from the device and to update the database with details relating to the notification; and a module to compare entries in the database with components from the notification to determine whether the inbound communication is related to the outbound communication of the device and if so to generate a second notification to the device to cause it to generate the message on the display of the device.

In the system, if the outbound communication is cancelled on the device prior to its transmission from the device, the database may be updated to delete a record relating to the outbound communication.

In the system, an option may be provided on the device to merge at least part of the inbound communication to the outbound communication after it is determined that the communications are related. Further, merging of the inbound communication to the outbound communication may be selectively undone to remove text of the inbound communication from the outbound communication.

In the system, the communication server may monitor for receipt of the new communication for the device only upon receiving a request to initiate such monitoring from the device. Additionally or alternatively, the communication server may monitor for receipt of the new communication only upon receiving a request to initiate such monitoring from the device.

In other aspects, various combinations of sets and subsets of the above aspects are provided.

Exemplary details of embodiments are provided herein. First, a description is provided on an exemplary communication network that provides features of an embodiment.

Next details are provided on an email server and a device which implement specific features of an embodiment. Finally, details are provided on exemplary processes and algorithms relating to an embodiment.

First, for details on an exemplary network for an embodiment, FIG. 1 shows communication system 100 where network 102 provides a suite of applications, services and data to its connected devices 104 through its associated servers. Devices 104 connect to network 102 through wired connections or through an external connection through Internet 106. Wireless devices 108 connect to network 102 through wireless network 110.

Network architectures of network 102 can be implemented in any known topologies. Wireless network 110 includes antenna, base stations and supporting radio transmission equipment known to those skilled in the art. In network 102, interface server 112 provides the main interface between network 102 and wireless network 110 to devices 108. Security systems within network 104 can be provided by known techniques and systems.

Communications are provided among devices 104 that are connected directly to network 102, devices 104 that are connected through Internet 106 and devices 108 that communicate through wireless network 110. One embodiment provides email communications based on a client-server architecture for an email system. Therein, attached local devices, such as devices 104 and even ultimately devices 108, are the clients to server 114. Email server 114 manages email communications among its connected devices 108. For an IP-based network, email server 114 has software provided thereon and is configured to monitor specific ports on which emails to and from its associated devices 108 are sent and received. Further detail on email server 114 is provided below.

Web server 116 is connected to interface server 112 and provides an interface for web page requests received from devices 104 and 108. The web pages may be stored locally within network 102 or may be located elsewhere in Internet 106.

Gateway 118 provides and monitors selected communications between elements in network 102 and external devices connected through Internet 106. Email server 114 is shown as passing its external (non-wired) emails through gateway 118.

In other network configurations, email server 114 may bypass gateway 118 for its external connections to Internet 106.

Database 120 provides a data storage system for one or more elements in network 102, including email server 114.

Figure 2:
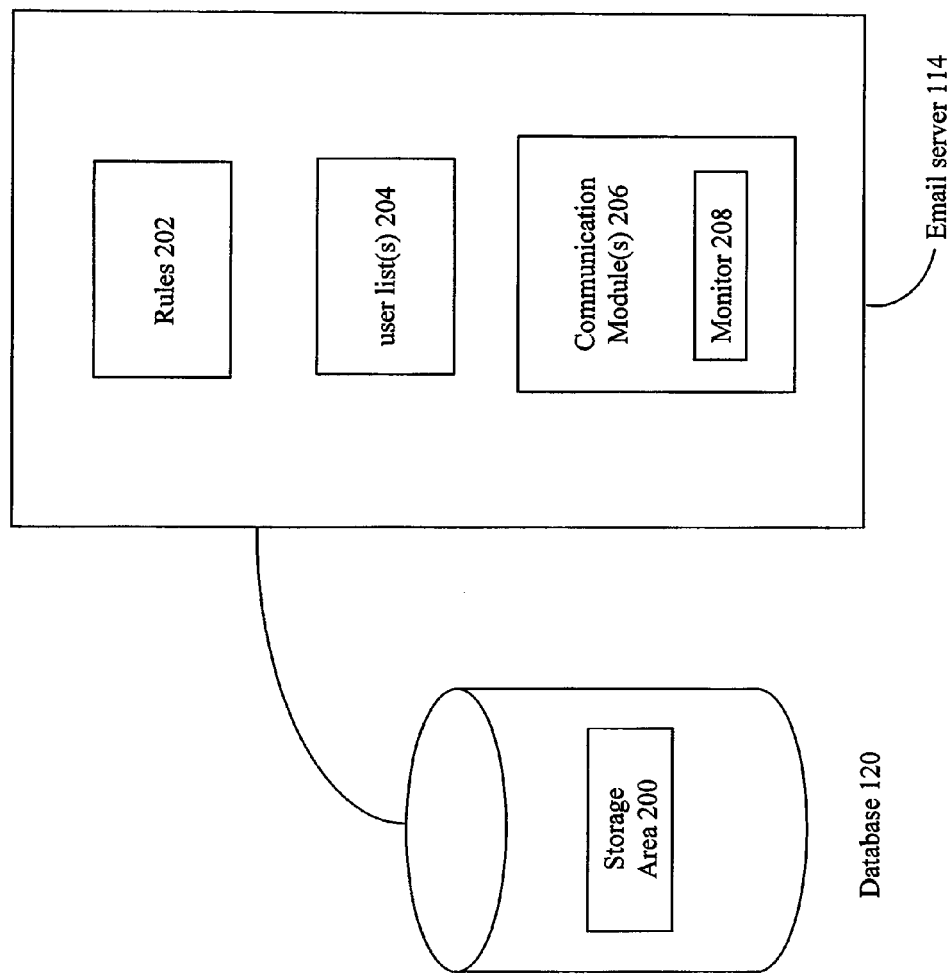
FIG. 2 is a block diagram of the email server of FIG. 1.

For communications directed to wireless devices 108, enterprise server 122 provides an interface with email server 114 for emails destined to, or coming from, devices 108. In a similar fashion to server 114, enterprise server can have components similar to those for server 114 as shown in FIG. 2, operating in a similar fashion. As such when emails are provided from server 114 to enterprise server 122, another local copy of the email may be stored in enterprise server 122. As such, enterprise server can have access to the header information of an email destined for device 108. Similarly for emails sent from device 108, enterprise server 122 can have information on the subject line, and all addresses of the email being sent.

Next, further detail is provided on email server 114. Referring to FIG. 2, email server 114 provides a mail transfer agent (MTA) that routes emails and provides a mail server. Typically, the server 114 supports client access, such as access from connected devices 104, using Post Office Protocol (POP), Internet message Access Protocol (IMAP), Single Mail transfer Protocol (SMTP) or other protocols.

Server 114 is a computer-based system having communication connections software and data storage. It has the following components related to processing emails: storage area 200, rules 202, user list 204 and communication modules 206. The storage area 200 and user list(s) 204 may be supported in database 120. Rules 202 may be embodied in software or firmware operating on server 114. Communications modules may be embodied in a set of firmware, hardware and software modules in server 114.

Storage area 200 is used to store local mail for local users and provides a temporary site for storage of messages as they are put in the process of being transmitted. Rules 202 provide a set of predetermined actions for server 114 when certain inbound or outbound message conditions are detected for one or more messages processed by server 114. Exemplary rules may impose distribution restrictions on emails originating from specific internal or external addresses. The rules may be implemented in software and storage area 200 may allow changes to the rules. The list of users 204 provides a database of local email accounts managed by server 114.

The communication modules provide lower level operations that allow for monitoring, processing and transferring of messages, signals and emails among server 114, its clients (e.g., connected devices 104) communications with interface server 112 and external connections to Internet 106.

Monitor module 208 is provided within or is associated with communication modules 206 to provide specific monitoring of new messages as they are being generated by clients communicating with email server 114.

Existing email protocols (e.g. POP, IMAP, SMTP, etc.) have similar email processing technologies. For each client, storage is provided to store a record of emails that are sent from or received at its account. This record may be a simple text file of the body of the email with the header information separated from, but stored with, the body. As such, the subject line, list of attachments and full list of recipients (either as direct "to" addressees or carbon copied "cc"—ed addressees) is provided in the record. In certain circumstances, blind carbon copy "bcc" information is also stored. A local identification number and a timestamp may be associated with the email. Other protocols may allow the header information for each email to be accessed in different manners.

When processing received emails for its associated clients, email server 114 receives the email, extracts the header, body and any attachments and updates the records for the list of emails associated with that particular client in storage space 200.

It will be appreciated that other variants on server 114 may be provided as interface points at other locations in the system 100. As noted earlier, a comparable server may be provided in association with enterprise server 122 for email communications handled between wireless devices 108 and devices 104 connected to server 114.

Meanwhile on each device 104, a local client application is executing thereon to process emails received from, and sent to, its server 114. For example, when a user of a device 104 wishes to review his received emails, for example, by opening up an email, the following processes and communications may be generated: first, the client email software contacts server 114 and asks server 114 to send a copy of the email to the device 104; then server 114 responds by sending the email to the device 104; next, the client software parses the email to separate the body from the header and subject line; next the client software generates a graphical user interface (GUI) that displays the contents of the email on the display of device 104.

The "asking and responding" protocol may be conducted through generation, sending, receiving and processing of predetermined messages by each of device 104 and server 114. The messages may contain additional custom data fields that are populated at the time the message is generated. For example, the messages may provide status information about the sender and/or initiate a request to the receiver. A protocol can use any messaging protocols between devices that is known to those of skill in the art.

When an email is generated at device 104, the following processes and messages can be executed between the client application and the email server: first, at the client through the GUI of the communication software operating thereon, the user activates a "new mail" action button, which causes the client software to open a new GUI providing a template for the email. If the "new mail" is actually a response to an existing email in the mail box of the device 104, the client software may automatically populate the body of the existing email into the body of the new email. Also, the recipient list and the subject line of the new email may be extracted from the existing email. Next, the new email is composed by the user within the GUI, within the email client software. When the email is complete and is sent (by activation of the send command in the GUI), the client software forwards the completed email to server 114 in one or more messages providing the body of the email, the address of the sender and the address(es) of the recipient(s). Thereafter, the email server processes the email for routing to its identified internal and external addressees.

Within the above noted client-server relationship, an embodiment provides an additional feature to user at an email client. In particular, an embodiment provides a notification to a user of receipt of a received email while the user is composing an email. Further, the notification may be focussed, such that it is provided to the user only if the user is composing an email and the received email relates to the email being composed. The received email can be linked to the email being composed if, for example, the two emails are siblings within the same email string. For example, consider a situation where a user is composing, but has not sent, an email through the email client software operating on device 104. The email is a reply to an email string. While he is composing that email, he receives a new email that is also part of that string. In that instance, the embodiment recognizes that the new email is related to the email being composed and provides a notification to the user through the client software of the receipt of the new email. As a further feature, an option may be provided to the user through the client software to change the email being composed, read the new email, stop composition of the current email or incorporate the new email into the body of the current email.

Further details on features of an embodiment are provided through an example of an email string being processed by several devices in a client-server email system. Referring to FIGS. 3A-3C, a chronology of generation and processing of three emails noted as 300A, 300B, and 300C is shown. The three emails are all part of the same email string that is distributed among users A, B, C, D and E. First, in email 300A the originating emailer D populates header 302A with: the text "Meeting" in the Subject Line; recipients A, B and C in the "To" field; recipient E in the "cc" field; and recipient F in the "bcc" field. In body 304A of email 300A, the text indicates that D would like to have a meeting at 9:00, subject to everyone's availability.

Once email 300A is complete, D activates the "send" command from his client email software, which sends the email to email server 114. Next, email server 114 receives email 300A distributes it each of A, B, C, E and F.

Next, referring to FIG. 3B, consider a situation where B receives and opens email 300A at his associated device 104. Next, he activates the "Reply" command which generates a responding email 300B that populates its body with the text of email 300A attached at the bottom in body 304B. Then he may begin entering his response in the body of the message.

Meanwhile, C receives his copy of email 300A and generates his response as in email 300C in FIG. 3C on C's device. His message is a "reply to all" recipients from email 300A and may be that he cannot make it. C activates his "send" command in his email client software, which then sends email 300C to email server 114, which then distributes email 300C to all of the noted recipients in header 302C. Email 300C is sent before recipient B has finished composing email 300B.

In this situation, the information sent by C may be useful to B for his reply. The embodiment assists in providing additional information relating to email 300C to recipient B. Therein, when email server 114 receives the email 300C server 114 analyzes email 300C and recognizes email 300C is addressed to B and that B is currently generating a response relating to the email string. As such, email server 114 generates and sends a notification to B that email 300C relating to email 300B and the email string has been received for him. Referring to FIG. 3D, when the notification is received at the email client on the device associated with B, the client software then generates message 306 and provides same into the GUI as email 300B is still being composed. The message indicates that there has been a further response in the email string. Optionally, the system can provide a dialogue box to allow B to cancel email 300B, review email 300C or append the text of email 300C into the text of email 300B. Other messages, icon activations, lights or other indicators may be provided to indicate the receipt of the incoming email. It is preferable that the indicators do not require the user to actively "close" their associated window generated on the user's device. Further, other options on how and when to provide an action in response to its receipt may be provided to B. The options and responses may be provided through the client software.

In an embodiment, different messages and actions may be executed on B's device as he is composing email 300B, when a notification of an incoming related email is received. Another set of actions may be provided to B as he sends email 300B. Different actions may be provided for different types of emails (e.g. replies, forwards, etc.). Table A provides a summary of exemplary actions that may be executed while email 300B is being composed or sent:

TABLE A

| Notification Received | Email 300B Type: Reply | Type: Fwd | Type: Reply All |
|---|---|---|---|
| During Composition | Warning icon is generated on the GUI where email 300B is being created | Warning icon is generated | Warning icon is generated |
| Upon activation of "Send" command | Warning with choice | Warning with choice | Warning (identify if distribution list (DL) is changed) with choice |
| Option 1 | Continue with Send | Continue with Send | Continue with Send |
| Option 2 | Reply to existing addressee using new message | Reply to existing addressee using new message (merge) | Reply to existing addressee using new message |
| Option 3 | Reply to new addressee using new message (merge) | not provided | Reply to new addressee using same DL |
| Option 4 | not provided | not provided | Reply to new addressee using new DL |
| Upon Activation of Selection provided in "Send" Command | Take to updated compose screen | Take to updated compose screen | Take to updated compose screen |

As noted in Table A, an embodiment may provide a further "merge" option to the user of device 108 as he is composing or as he is about to send an email. Therein, if the embodiment determines that a related email has been received while the email is being composed, the embodiment can provide the user with an option to merge the related email into the current email. The option process can be provided through a GUI on device 108. It will be appreciated that other options may be provided. As part of the merge function, additional options or features may be provided in the email being composed, such as highlighting the merged text, once the merge action is completed. Next, an "undo" option may be provided to revert the message to its pre-merged contents after an email is merged into the email being composed. Next, if a received message is merged, the email program on device 108 may mark that message as "read", and send a message to serve 114 to update its status to reflect its "read" state. As such, an icon associated with the received mail, as generated by the email program on device 108, may be updated (either from a signal from server 114 or by device 108 itself) to reflect the "read" state of the received message. Presentation, selection and modification of any of these options may be provided through a GUI that operates on device 108. Additionally or alternatively, administrative software operating on server 114 may have a GUI interface to set such options as well.

For the embodiment as described, it is necessary that an element within the network have knowledge of when an email is being composed and when a related email is being sent to the composer. One implementation has the email client software on device 104 provide one or more notifications to the email server 114 when a new email is being generated and when the email has been sent from device 104. The notification may include data provided in the header of the email, including the subject line, and the list of recipients, and any temporary identification number associated with the new email. The identification number may be generated by the email client software or the email server 114. Once this data is provided, the email server can then analyze emails as notifications from all of its connected parties and then identify any relationships among emails received with emails being generated (but not yet sent), and for any matches found, send appropriate notification(s) to the devices 104 where the emails are being generated.

It will be appreciated that an email being composed on a client that has not yet been finalized (e.g., by the activation of the "send" command) may have changes made to its recipient list and its subject line up to the point of activation of the sending of the message. It is preferable that in one embodiment, the current information about the current intents of the subject line and/or the recipient list be communicated to the server software.

The embodiment may also selectively request that the monitoring be activated and deactivate upon specific events, such as saving of a draft of the email being composed or a certain time conditions being satisfied.

One technique of identifying relationships among emails is to make linkages among emails when the contents of the subject fields match or sufficient matches. Some prefix stripping can be conducted before an analysis of the emails is conducted, for example, by removing "REPLY", "FW" and other prefix annotations (and combinations thereof) inserted by the email system controlling the overall contents of the email. Other techniques may conduct an analysis of the recipient lists to determine whether there are sufficient matches in the group of addressees, either collectively or in individual TO, FROM, CC or BCC fields. Combinations and variations on these relationships can be provided, including partial matches on subject lines and groups of addressees. Searches can be restricted to messages satisfying timestamp conditions as well. Again, such options may be set through software operating on either device 108 and/or server 114.

Figure 5:
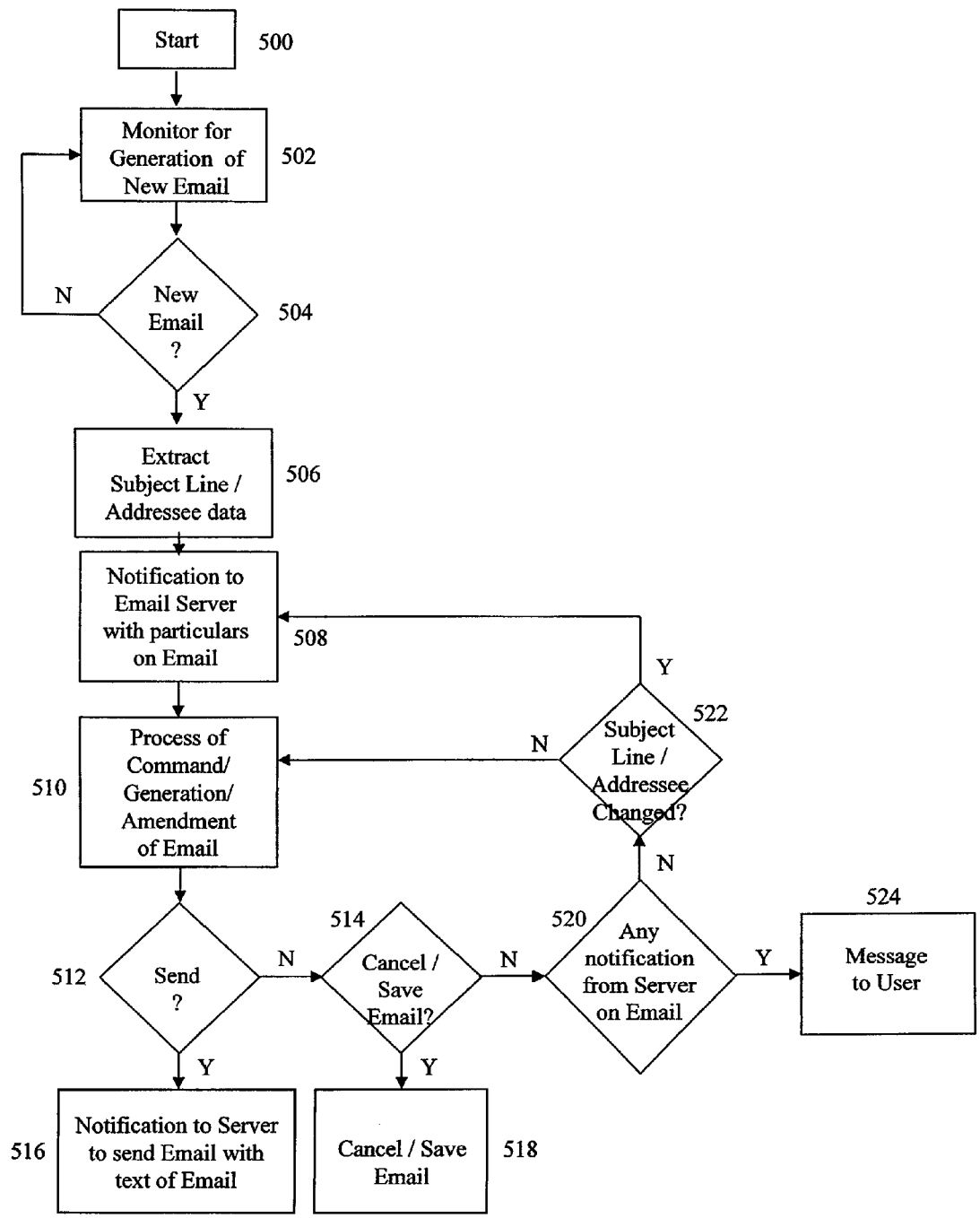
FIG. 5 is a flowchart of exemplary steps executed by a device communicating with the email server of FIG. 1 when composing an email in accordance with an embodiment.

Further detail is now provided in FIGS. 4 and 5 providing two exemplary processes executed contemporaneously on email server 114 and client software on device 104 to coordinate communication of emails and notifications to allow an embodiment to track when and where to send notifications of receipt of relevant emails to individual devices 104. In these processes, the main monitoring for new emails may be continually active on server 114. When the process detects a relevant email, it sends email status notifications to device 108. FIG. 4 provides a description of a process operating on email server 104; FIG. 5 provides a description of a process operating on device 104. Each is described in turn. Thereafter a description is provided on variations of these processes of FIGS. 4 and 5.

Referring to FIG. 4, a process operating on email server 114 operates as follows. Start step 400 is the initiation process for server 114. It may conduct a roll call to determine devices 104 and outside networks 102 that are connected to it and allocate appropriate storage resources to track emails per client.

Once any initiation processes and resources are complete, email server 114 monitors for the receipt of a notification in step 402. A notification indicates receipt of an email or a status message from a device 104. For example, a can indicate that a new email is being composed at a client or that an email is being sent from the client.

At step 404, a loop test is made to determine whether a notification has been received. If no notification has been received, then the process returns to step 402. If a notification has been received, then the notification is evaluated in a series of tests.

Test 406 evaluates whether the notification is for a new email that is addressed to a client that is part of the immediate email network of server 114. If the notification is not for an email, then the process proceeds to the second test, noted below.

If the email is for a client, then the following steps are executed. First, the email is processed in step 408 where the body and header of the email is parsed to identify any components that are tracked to evaluate matches with other emails (e.g. the subject line of the email). The extracted components are evaluated and a list that tracks the such components for the purposes of identifying relationships among emails and notifications is updated in step 410. The list can track aspects like the addressees of the notification, a status associated with the notification, a timestamp, subject matter text and any internal tracking code assigned to the notification. Next, at step 412 if the email matches a criteria for an identified email string per item in the tracked list, then an evaluation is made to determine whether there is any open, but unsent email that relates to that string for a client of server 114. If there is such an unsent email, then at step 414, a notification of the email is generated and sent to the client. If there is no match from step 412, then the process returns to step 402.

If test 406 determines that the notification is not for an email, then a second test 416 is executed where the notification is evaluated to determine whether it relates to a new email being composed by the client in step 416. If the notification does relate to a new email, then at step 418 the process parses the body and the header of the email to identify any components that are tracked to evaluate matches with other emails. Again, the extracted components are evaluated and the list that tracks such components (as noted above) is updated. Next, the process returns to step 402.

If test 416 indicates that the notification does not relate to a new email being composed by the client, then the process proceeds to test 420 where the notification is assessed to determine whether it relates to the sending of an email from a client. If the notification does not relate to the sending of an email, then the process proceeds to step 422 where the notification is for a different matter, such as an exception, handled by an embodiment. In this regard, the notification does not relate to any of the above three noted situations.

If test 416 indicates that the notification does relate to the sending of an email from the client, then at step 424 the email is retrieved from the client, the body and the header of the email are parsed and the lists are updated, in particular to delete or change any previous notifications indicating that this email was open, but not yet sent. Proceeding to step 426, the email is sent through known processed of email server 114 and then the process returns to step 402.

It will be appreciated that variations on the above process can be provided where the steps are provided in different orders or some of the steps are omitted or additional steps are provided to further process the notifications. It will further be appreciated that a notification as described may be provided in one or more of several signalling techniques, including using messages, semaphores, setting values in predetermined shared memory locations as flags for various states, etc., using techniques known to those in the art.

In the meantime, a process is operating on each client (i.e. device 104) that is associated with server 114. Referring to FIG. 5 as a client is processing its email, the process shown therein receives and generates messages, aside from the email messages, with the email server 114. The messages relate to notifications and statuses of various aspects of the email.

The first step in the process is at start 500. Start step 500 is an initiation process for email client of device 104. It conduct an initial retrieval of emails addressed to it from server 114.

Immediately thereafter, at step 502, the email client monitors for the generation of any new email on device 104 by its user. It may also at this time monitor for the receipt of any new emails. However, for the purposes of this feature of the embodiment, only the monitoring of the generation of a new outbound email is described.

As such, test 504 is conducted to determine whether a new email is being generated. A signal in the email client software may be generated when the user activates a "new mail", "reply to mail", "forward mail" or other email generating command from the GUI of the local email software operating on device 104. If no new email signal is detected, then the process returns to step 502.

If a new email is being generated, for example as per email 300B in FIG. 3B, then at step 506, the client software monitors for the completion of the header fields and extracts their data from the email generation GUI. As the email is being generated in real time, the client software may need to obtain one or more snapshots of the data in the header to determine whether any additional changes are being made to its contents. Next, once a sufficient lock-down event has occurred for step 506 (e.g. the passage of a given amount of time, the recognition that the email is in "reply" to an existing email string, at step 508, a notification is generated and provided to email server 114 with the particulars on the email being generated. The notification can include various details relating to the email including the subject line, a time stamp, a list of addressees and any internal identification number assigned to the email. This notification is received by the email server 114 and is processed per the tests identified in steps 402, 404, 406 and 416, described earlier.

Next, the email client processes and builds the email as the user continues to compose it at step 510. If the user decides to make a change to the field in the header, a further notification may be provided by the client to the server. During step 510, the user may send, cancel or save the email. Processing these actions is conducted in tests 512, 514 and 520. In test 512, if the send command is initiated, then at step 516, a notification of the sending of the email is generated and provided to the email server 114 with the text of the email and any of its attachments. As an option (not shown), prior to the sending of the email, device 108 may check for receipt of any relevant notification from server 114. If a notification is received, an indication of receipt of the relevant email may be generated on device 108. The indication may be an icon, a message or additional indicator. Also, additional options may be provided to device 108. If no notification is received, then the email may be sent per step 516. If the command is to cancel or save the email, then at test 514 the process determines what command has been issued. If a cancel or save command was issued, then at step 518 the email is cancelled or saved accordingly. A follow-up notification may be generated and sent from device 104 to server 114 to update the lists with the new status of the email being composed. If a cancel or save command has not been initiated, then at test 520 the process determines whether any notification from email server 114 has been received that relates to the email being generated. Step 520 represents the processing of the client software of the notification sent from email server 114 in step 414 in FIG. 4. However, if no notification has been received from server 114, then the process returns to step 510.

Next at step 522, the process evaluates whether a field in the header of the email being composed. Alternatively, step 522 may simply provide a new notification to email server 114 with the current details of the email being composed, per step 508. This step may or may not be conducted as a similar step was done in step 510.

Returning to test 520, if a notification from the email server has been provided, then a message is provided to the user in the GUI by the client software in step 524. This message can be embodied in the form of the message 306 shown in FIG. 3D. It will be appreciated that the message can take various forms, including a simple message indicating that a new message has been received or a new selection may be provided to the user to amend his current email or incorporate the received message from the new email. Additionally or alternatively, other indicators or notifications may be provided on device 108 of the receipt of the related message, including providing an indicator in a GUI on the device, providing a message in a window on the device, activating a specific message field in the GUI, etc. It will be appreciated that notification of receipt of the related message is a separate process from the generation of notification messages described earlier relating to the monitoring of receipt of related messages.

It will be appreciated that the processes shown in FIG. 5 show one exemplary method for processing new emails at the client. Some of the steps may be conducted in different orders in other embodiments and additional steps may be provided or some of the steps may be removed.

As a variation on the processes described in FIGS. 4 and 5, other processes may be provided that monitor for receipt of a notification by server 114 (per step 402, FIG. 4) only after device 108 provides a request to server 114. The request may be in the form of an "initiate monitoring" message sent to server 114. As such, only upon receiving the signal, would server 114 activate the monitoring process. Once activated, the monitoring process can also be deactivated, either by server 114 or by the generation and sending of a "terminate monitoring" message to server 114. The conditions for terminating the monitoring may be the sending of the email by device 108, or expiry of a predetermined time window, as provided by either device 108 or server 114. It can be seen that in this process, some monitoring by server 114 can be eliminated, thereby saving some processing cycles.

In the above noted variation, the process on email server 114 may be similar to the process in FIG. 4, with the following amendments: between start 400 and monitor step 402, a further test is inserted where the monitor process is initiated only after receiving an initiate monitor signal from device 108. The initiate monitor signal may include information on an email currently being generated on device 108. As such, the monitor process may be focussed to monitor only for emails that meet subject line or addressee list criteria as noted earlier. Additional time parameters may be included as a criteria. As such, when monitoring is initiated, the search may also review received communications that have been received within a defined time window from the generation of the command. As such, the process may add or amend tests as provided in steps 406, 415 and 420 of FIG. 4.

As a further modification, the process may have another on-going monitor for receipt of a "terminate monitoring" message or satisfaction of a predetermined condition to terminate the monitoring. At such time the process would update monitoring lists with the current status information, then suspend all current monitoring activities for that specific device 108 and then wait for a further "initiate monitor" signal.

Similarly, for the process operation a device 108, some changes to the process shown in FIG. 5 may be provided. One change would be to generate the "initiate monitor signal" as described above. This signal may be generated as part of the notification sent to server 114 as described in step 508 of FIG. 5.

With the processes as described operating on server 114 and device 108, additional features can be provided. For example, one the notification process is initiated on server 114, it may check a time history parameter that defines a period of time to check for additional, relevant messages that may have been received by server 114 prior to the initiation message. For example, in an embodiment where the monitoring process is turned on and off and when a draft message is being re-opened for further composition, the time parameter window may require the server 114 to check for new messages that were received in a window between the time when the draft message was closed and when it was re-opened. The time parameter may be provided as data in the "initiate monitoring" message. The parameter may be set by the user through a GUI on device 108. Alternatively, a separate message may be generated by device 108 to initiate a rescan of messages that match a certain criteria, including a time parameter. The rescan message may be generated and sent automatically by device 108. Alternatively, it may be generated upon a specific request by user 108 through software operating on device 108.

Further still, in another embodiment, processes as described above in for the server 114 and device 108 in receiving, tracking and processing of emails and any notifications related thereto may be implemented in on a single system or device, such as solely on as a client system communicating with a server, on a stand alone computer or on device 108.

Further detail is now provided on device 108 as it too may implement an embodiment. Referring to FIG. 6, electronic device 108 is based on a computing platform having functionality of an enhanced personal digital assistant with cellphone and e-mail features. It is, however, to be understood that electronic device 108 can be based on construction design and functionality of other electronic devices, such as smart telephones, desktop computers, pagers or laptops having telephony equipment. In a present embodiment, electronic device 108 includes a housing 600, an LCD 602, speaker 604, an LED indicator 606, a trackball 608, an ESC ("escape") key 610, keypad 612, a telephone headset comprised of an ear bud 614 and a microphone 616. Trackball 608 and ESC key 610 can be inwardly depressed along the path of arrow "A" as a means to provide additional input to device 108.

It will be understood that housing 600 can be made from any suitable material as will occur to those of skill in the art and may be suitably formed to house and hold all components of device 108.

Device 108 is operable to conduct wireless telephone calls, using any known wireless phone system such as a Global System for Mobile Communications (GSM) system, Code Division Multiple Access (CDMA) system, CDMA 2000 system, Cellular Digital Packet Data (CDPD) system and Time Division Multiple Access (TDMA) system. Other wireless phone systems can include Bluetooth and the many forms of 802.11 wireless broadband, like 802.11a, 802.11b, 802.11g, etc. that support voice. Other embodiments include Voice over IP (VoIP) type streaming data communications that can simulate circuit-switched phone calls. Ear bud 614 can be used to listen to phone calls and other sound messages and microphone 616 can be used to speak into and input sound messages to device 108.

Referring to FIG. 7, functional components of device 108 are provided in schematic 700. The functional components are generally electronic, structural or electro-mechanical devices. In particular, microprocessor 702 is provided to control and receive almost all data, transmissions, inputs and outputs related to device 108. Microprocessor 702 is shown schematically as coupled to keypad 612 and other internal devices. Microprocessor 702 preferably controls the overall operation of the device 108 and its components. Exemplary microprocessors for microprocessor 702 include Data 950 (trade-mark) series microprocessors and the 6200 series microprocessors, all available from Intel Corporation. Microprocessor 702 is connected to other elements in device 108 through a series of electrical connections to its various input and output pins. Microprocessor 702 has an IRQ input line which allows it to receive signals from various devices. Appropriate interrupt firmware is provided which receives and reacts to the signals detected on the IRQ line.

In addition to the microprocessor 702, other internal devices of the device 10 are shown schematically in FIG. 7. These include: display 602; speaker 604; keypad 612; communication sub-system 704; short-range communication sub-system 706; auxiliary I/O devices 708; serial port 710; microphone port 712 for microphone 616; flash memory 714 (which provides persistent storage of data); random access memory (RAM) 716; clock 718 and other device sub-systems (not shown). Device 108 is preferably a two-way radio frequency (RF) communication device having voice and data communication capabilities. In addition, device 108 preferably has the capability to communicate with other computer systems via the Internet.

Operating system software executed by the microprocessor 702 is preferably stored in a computer-readable medium, such as flash memory 714, but may be stored in other types of memory devices, such as read-only memory (ROM) or similar storage element. In addition, system software, specific device applications, or parts thereof, may be temporarily loaded into a volatile store, such as RAM 716. Communication signals received by the mobile device may also be stored to RAM 716.

Microprocessor 702, in addition to its operating system functions, enables execution of software applications on device 108. A set of software (or firmware) applications, generally identified as applications 720, that control basic device operations, such as voice communication module 720A and data communication module 720B, may be installed on the device 108 during manufacture or downloaded thereafter. As well, additional software modules, such as software module 720N, which may be for instance a personal information manager (PIM) application, may be installed during manufacture or downloaded thereafter into device 108. Data associated with each application can be stored in flash memory 714.

Data communication module 720B may comprise processes that implement features for device 108 as provided and described in FIG. 5 (and its variants described herein), allowing device 108 to generate an indication on device 108 that a relevant message has been received. As noted earlier, the indicator may be an icon, a "pop-up" messages or other indicators.

Communication functions, including data and voice communications, are performed through the communication sub-system 704 and the short-range communication sub-system 706. Collectively, sub-systems 704 and 706 provide the signal-level interface for all communication technologies processed by device 108. Various applications 720 provide the operational controls to further process and log the communications. Communication sub-system 704 includes receiver 722, transmitter 724 and one or more antennas, illustrated as receive antenna 726 and transmit antenna 728. In addition, communication sub-system 704 also includes processing modules, such as digital signal processor (DSP) 730 and local oscillators (LOs) 732. The specific design and implementation of communication sub-system 404 is dependent upon the communication network in which device 108 is intended to operate. For example, communication sub-system 404 of device 108 may operate with the Mobitex (trade-mark), DataTAC (trade-mark) or General Packet Radio Service (GPRS) mobile data communication networks and also operate with any of a variety of voice communication networks, such as Advanced Mobile Phone Service (AMPS), Time Division Multiple Access (TDMA), Code Division Multiple Access (CDMA), CDMA 2000, Personal Communication Service (PCS), Global System for Mobile Communication (GSM), etc. Other types of data and voice (telephonic) networks, both separate and integrated, may also be utilized with device 108. In any event, communication sub-system 404 provides device 108 with the capability of communicating with other devices using various communication technologies, including instant messaging (IM) systems, text messaging (TM) systems and short message service (SMS) systems.

In addition to processing communication signals, DSP 730 provides control of receiver 722 and transmitter 724. For example, gains applied to communication signals in receiver 722 and transmitter 724 may be adaptively controlled through automatic gain-control algorithms implemented in DSP 730.

In a data communication mode, a received signal, such as a text message or Web page download, is processed by the communication sub-system 704 and is provided as an input to microprocessor 702. The received signal is then further processed by microprocessor 702 which can then generate an output to display 602 or to an auxiliary I/O device 708. A device user may also compose data items, such as e-mail messages, using keypad 612, trackball 608 and/or some other auxiliary I/O device 708, such as a touchpad, a rocker switch or some other input device. The composed data items may then be transmitted over communication network 110 via communication sub-system 704. Sub-system 704 may also detect when it is out of communication range for its remote systems.

In a voice communication mode, overall operation of device 108 is substantially similar to the data communication mode, except that received signals are output to speaker 604, and signals for transmission are generated by microphone 616. Alternative voice or audio I/O sub-systems, such as a voice message recording sub-system, may also be implemented on device 108. In addition, display 602 may also be utilized in voice communication mode, for example, to display the identity of a calling party, the duration of a voice call, or other voice call-related information.

Short-range communication sub-system 706 enables communication between device 104 and other proximate systems or devices, which need not necessarily be similar devices. For example, the short-range communication sub-system may include an infrared device and associated circuits and components, or a Bluetooth (trade-mark) communication module to provide for communication with similarly enabled systems and devices.

Powering the entire electronics of the mobile handheld communication device is power source 734. In one embodiment, the power source 734 includes one or more batteries. In another embodiment, the power source 734 is a single battery pack, especially a rechargeable battery pack. A power switch (not shown) provides an "on/off" switch for device 108. A power source interface (not shown) may be provided in hardware, firmware, software or a combination of such elements to selectively control access of components in device 108 to power source 734. Upon activation of the power switch an application 720 is initiated to turn on device 108. Upon deactivation of the power switch, an application 720 is initiated to turn off device 108. Power to device 108 may also be controlled by other devices and by software applications 720. Other components in device 108 include GPS module 740 and light sensor 742.

The embodiments have been described for systems implementing an email communication system. However, it will be appreciated that other embodiments may implement the features in any communication protocol or system including email, messaging, text messages, telephone calls, cellular call and other communication platforms where a communication is being composed or sent and it is useful to obtain information about related inbound communications as they arrive, especially when they relate to the outbound communication.

It will be appreciated that the embodiments relating to devices, servers and systems may be implemented in a combination of electronic hardware, firmware and software. The firmware and software may be implemented as a series of processes and/or modules that provide the functionalities described herein. Data may be stored in volatile and non-volatile devices described herein and be updated by the hardware, firmware and/or software. Other network embodiments may use non-client server architectures for management of communications.

It will further be appreciated that embodiments may be provided to monitor, filter and notify a communication device of receipt of other forms of communications, such as SMS messages, text messages, voice messages or other forms of communications. Embodiments are described herein where the monitoring is being conducted for the same types of communications (e.g. monitoring for receipt of related emails when generating a new email). Other embodiments may have the monitoring for a different type of communication (e.g. SMS message, or telephone call), when composing an email. Other variations on the types of communications to monitor when generating another type of communication can be provided.

The present disclosure is defined by the claims appended hereto, with the foregoing description being merely illustrative of embodiments of the disclosure. Those of ordinary skill may envisage certain modifications to the foregoing embodiments which, although not explicitly discussed herein, do not depart from the scope of the disclosure, as defined by the appended claims.

The invention claimed is:

1. A method for providing information relating to a recently received communication for a device in a network, the method comprising:
   while an outbound communication message is being composed on the device, generating and sending a notification to a server in the network with particulars on the outbound communication message; and
   generating a message on a display of the device indicating receipt of an inbound communication that is related to the outbound communication, the message providing options for processing the inbound communication depending on whether the outbound communication is initiated as either a reply to the inbound communication or a forwarding of the inbound communication, the options including a first set of options for processing the inbound communication when the outbound communication is initiated as a reply to the inbound communication; and
at least one of
a second set of options for processing the inbound communication when the outbound communication is initiated as a forwarding of the inbound communication; or
a third set of options for processing the inbound communication when the outbound communication is initiated as a reply to all to the inbound communication.

2. The method for providing information relating to a recently received communication for a device as claimed in claim 1, wherein:
the notification is sent after a lock-down event has occurred for the outbound communication message.

3. The method for providing information relating to a recently received communication for a device as claimed in claim 2, wherein:
the lock-down event is one of passage of a given amount of time or recognition that the outbound message is a reply to an existing communication string.

4. The method for providing information relating to a recently received communication for a device as claimed in claim 2, wherein:
the notification contains details relating to the outbound communication including at least one of a subject line, a time stamp and a list of addressees.

5. The method for providing information relating to a recently received communication for a device as claimed in claim 1, further comprising:
maintaining a database tracking received inbound communications destined for the device; and
updating the database upon receipt of the inbound communication for the device.

6. The method for providing information relating to a recently received communication for a device as claimed in claim 5, further comprising:
updating the database to delete a record relating to the outbound communication if the outbound communication is cancelled prior to its transmission from the device.

7. The method for providing information relating to a recently received communication for a device as claimed in claim 1, wherein:
the server is an email server;
the outbound communication is an email being composed;
the inbound communication is a received email;
the device is operating email client software; and
the received email is being forwarded to the device from the email server.

8. The method for providing information relating to a recently received communication for a device as claimed in claim 7, wherein the email client software and the email server communicate through generation and transmission of messages therebetween relating to received emails and emails being composed.

9. The method for providing information relating to a recently received communication for a device as claimed in claim 1, further comprising:
upon activation of a send command for the outbound communication from the device, generating and providing a second message on the display of the device indicating receipt of the inbound communication.

10. The method for providing information relating to a recently received communication for a device as claimed in claim 9, wherein the second message provides an option to reply to an addressee of the outbound communication with a new message for the outbound communication or to continue sending the outbound communication.

11. The method for providing information relating to a recently received communication for a device as claimed in claim 1, wherein:
when the outbound communication is initiated as the reply, a warning message is generated if a distribution list of addressees associated with the outbound communication differs from a distribution list of the inbound communication.

12. An electronic communication device providing processing of inbound and outbound communications, comprising:
memory;
a module to compose an outbound communication;
a notification module to generate and transmit a notification about the outbound communication when the outbound communication is being composed;
a module to monitor for receipt of an inbound communication or a second notification;
a module to evaluate information in the inbound communication against information of the outbound communication to determine whether the inbound communication is related to the outbound communication; and
a module to generate a message on a display of the device if the inbound communication is related to the outbound communication, the message providing options for processing the inbound communication, the options including:
a first set of options for processing the inbound communication when the outbound communication is initiated as a reply to the inbound communication; and
at least one of
a second set of options for processing the inbound communication when the outbound communication is initiated as a forwarding of the inbound communication; or
a third set of options for processing the inbound communication when the outbound communication is initiated as a reply to all to the inbound communication.

13. The electronic communication device as claimed in claim 12, wherein the notification module:
sends the notification after a lock-down event has occurred for the outbound communication message.

14. The electronic communication device as claimed in claim 13, wherein:
the lock-down event is one of passage of a given amount of time or recognition that the outbound message is a reply to an existing communication string.

15. The electronic communication device as claimed in claim 12, wherein:
the notification contains details relating to the outbound communication including at least one of a subject line, a time stamp and a list of addressees; and
merging of the inbound communication to the outbound communication is selectively undone to remove text of the inbound communication from the outbound communication.

16. The electronic communication device as claimed in claim 12, wherein:
the device is operating email client software; and
the email client software and the email server communicate through generation and transmission of messages relating to received emails and emails being composed.

17. The electronic communication device as claimed in claim 12, wherein an option is provided on the device to merge at least part of the inbound communication to the outbound communication after the inbound communication is determined to be related to the outbound communication.

* * * * *

UNITED STATES PATENT AND TRADEMARK OFFICE
CERTIFICATE OF CORRECTION

| | | |
|---|---|---|
| PATENT NO. | : 8,433,766 B2 | Page 1 of 1 |
| APPLICATION NO. | : 13/351837 | |
| DATED | : April 30, 2013 | |
| INVENTOR(S) | : Arun Munje, Andrew Turcotte and David Vanden Heuvel | |

It is certified that error appears in the above-identified patent and that said Letters Patent is hereby corrected as shown below:

Title page, item [*] Notice -- insert --

-- This patent is subject to a terminal disclaimer against U.S. Patent No. 7,890,589. --

Signed and Sealed this
Twenty-third Day of September, 2014

Michelle K. Lee
*Deputy Director of the United States Patent and Trademark Office*